United States Patent

Kunz et al.

[11] Patent Number: 5,781,707
[45] Date of Patent: Jul. 14, 1998

[54] METHOD AND APPARATUS FOR PREVENTING PRINT OVERRUNS BY CONTROLLING PRINT ENGINE SPEED

[75] Inventors: Robert J. Kunz; David Alan Bartle, both of Boise, Id.

[73] Assignee: Hewlett-Packard Company, Palo Alto, Calif.

[21] Appl. No.: 673,455

[22] Filed: Jun. 24, 1996

[51] Int. Cl.$^6$ .............................. G06F 15/00; H04N 1/00; H04N 1/36
[52] U.S. Cl. .................. 395/105; 395/103; 395/116; 358/401; 358/409; 358/412
[58] Field of Search .................................... 395/105, 109, 395/112, 113, 115, 114, 250, 116, 103; 358/401, 409, 412, 486

[56] References Cited

U.S. PATENT DOCUMENTS

| 5,129,049 | 7/1992 | Cuzzo et al. | 395/113 |
|---|---|---|---|
| 5,239,313 | 8/1993 | Marko et al. | 346/108 |
| 5,444,827 | 8/1995 | Briggs et al. | 395/115 |
| 5,457,483 | 10/1995 | Oikawa | 347/129 |
| 5,524,186 | 6/1996 | Campbell | 395/115 |

*Primary Examiner*—Edward L. Coles
*Assistant Examiner*—Mark Wallerson
*Attorney, Agent, or Firm*—Lane R. Simmons

[57] ABSTRACT

The printing speed of a page printer is modified relative to rasterization execution time (RET) for display commands that define images to be printed on each page strip of a page. The printer includes a variable frequency clock for producing a plurality of clock frequencies for modifying the printing speed. A processor compares the RET for each page strip with a threshold value. When a complex page strip is found whose RET exceeds the threshold, the variable frequency clock is appropriately controlled to generate a lower frequency clock signal to the print engine. The lower frequency signal causes the print engine to operate at a modified (slower) rate for a sufficient amount of time on any previously queued page strip(s) to provide an extended time frame for allowing the complex page strip to be rasterized. Printing speed is slowed, but rasterization time (clock speed) for the complex page strip is not slowed. Accordingly, display commands in the complex page strip are rasterized within the extended amount of time provided by the reduced print speed, thereby preventing a print overrun.

21 Claims, 3 Drawing Sheets

METHOD AND APPARATUS FOR PREVENTING PRINT OVERRUNS BY CONTROLLING PRINT ENGINE SPEED

FIELD OF THE INVENTION

This invention relates to printers and, more particularly, to a method and apparatus for printing a page by controlling the print engine speed of the printer relative to rasterization time of individual page strips in the page.

BACKGROUND OF THE INVENTION

In printers that employ laser engines as the "print mechanism", data must be provided at a speed that is fast enough to keep up with the print action (which can be measured by the rate of movement of the paper past the imaging drum). In such printers, formatting is either performed on the host computer, with large volumes of rasterized image data shipped to the printer at high speed, or on a formatter within the printer itself. Since a conventional laser printer engine operates at a constant speed, if rasterized image data is not available when a previous segment of image data has been imprinted, a "print overrun" occurs and the page is not printable.

Several methods have been used in the prior art to avoid print overruns. First, a full raster bit map of an entire page may be stored in the printer so that the print mechanism always has rasterized data awaiting printing. However, this solution requires large amounts of random access memory (RAM) for each page. A second method for assuring the availability of print data to a laser printer is to construct a display list from the commands describing a page. During formatting, a page description received from a host is converted into a series of simple commands, called display commands, that describe what must be printed. The display commands are parsed and sorted according to their vertical position on the page. The page is then divided into sections called page strips, which page strips are then individually rendered into a raster bit map (rasterized) and passed to the print engine for printing. This procedure enables lesser amounts of RAM to be used for the print image.

When the display commands are rasterized at a fast enough pace, the same memory used to store a first page strip can be reused for a subsequent page strip further down the page. For example, in certain prior art printers it is known to employ three raster buffers for storing page strips. During page processing, the first buffer is reused for a fourth strip on the page, the second is reused for a fifth strip, etc. However, under standard (generally maximum) page-per-minute performance, little time is left between finishing printing of a strip and when a next strip is required to be rasterized from the same print buffer.

Under certain circumstances, "complex" page strips will include many display commands and require a longer than normal time for rasterization. In the case of a complex strip, rasterization time may increase to such an extent that the succeeding strip can not be delivered on time and a print overrun will occur.

In U.S. Pat. No. 5,129,049 (Cuzzo et al.), a page printer is described which addresses the problem created by complex page strips. Cuzzo divides each page of text into lateral page strips and allocates a maximum page strip rasterization time to each page strip, based upon the printer's page print time. An individual rasterization time for each page strip is then calculated, based upon the complexity of the display commands contained within the page strip. If the individual rasterization time for a page strip exceeds the allocated maximum page strip rasterization time, indicating a complex page strip, the page strip is rasterized immediately and stored for subsequent imaging. Otherwise, the display commands for the page strip are inserted into a queue and are rasterized in order as they are reached for imaging. Whenever a complex page strip is reached for processing, its pre-rasterized version is immediately accessed and imaged—thereby preventing a print overrun.

In U.S. Pat. No. 5,444,827 (Briggs et al.), a page printer is described that prevents print overruns by rasterizing complex page strips using an increased clock frequency. A variable frequency clock produces at least two clock frequencies, one higher than the other. A processor operates under the first (slower) clock frequency to determine rasterization execution time (RET) for display commands in each page strip of a page. Any strip whose RET does not exceed a predetermined threshold value is rasterized and processed under the influence of the slower clock speed whereby less power is used and less heat is dissipated. Any strip whose RET exceeds the threshold value (i.e., a complex strip) is rasterized and processed under the second (faster) clock frequency, thus preventing a print overrun without pre-rasterizing the strip, but thus using more power and generating more heat than at the slower clock frequency.

One drawback associated with these prior art printers and other conventional printers is that the print engine operates at a constant speed. As such, rasterization of complex strips is only managed relative to the constant engine speed (or constant rate of movement of a page through the printer). There is no suggestion to alter the conventional constant engine speed.

Accordingly, an object of the present invention is to provide a means and method for preventing print overruns by overcoming the constant print engine speed limitation of a conventional printer.

SUMMARY OF THE INVENTION

According to principles of the present invention in a preferred embodiment, the printing speed of a page printer is modified relative to rasterization execution time (RET) for display commands that define images to be printed on each page strip of a page. The printer includes a variable frequency clock for producing a plurality of clock frequencies for modifying the printing speed. A processor compares the RET for each page strip with a threshold value. When a complex page strip is found whose RET exceeds the threshold, the variable frequency clock is appropriately controlled to generate a lower frequency clock signal to the print engine. The lower frequency signal causes the print engine to operate at a modified (slower) rate for a sufficient amount of time on any previously queued page strip(s) to provide an extended time frame for allowing the complex page strip to be rasterized. Printing speed is slowed, but rasterization time (clock speed) for the complex page strip is not slowed. Accordingly, display commands in the complex page strip are rasterized within the extended amount of time provided by the reduced print speed, thereby preventing a print overrun. Advantageously, printing speed is modified to prevent print overruns especially for a printer having limited memory.

Other objects, advantages, and capabilities of the present invention will become more apparent as the description proceeds.

DETAILED DESCRIPTION OF THE PREFERRED EMBODIMENTS

Figure 1:
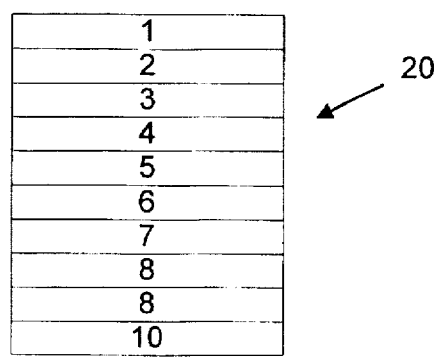
FIG. 1 shows an outline of a page and how it is logically divided into ten contiguous page strips.

Referring to FIG. 1, a page printer incorporating the present invention treats a page 20 as a series of page strips. As an example, ten strips are shown, each one covering a horizontal portion of page 20. Obviously, the choice of ten strips is merely exemplary and other page strip allocations are equally contemplated. Text, graphics, etc. appearing in any one strip are treated separately during processing of the page. If it is assumed that the page printer has the capability of producing eight pages per minute, each page will be produced in 7.5 seconds. Since there are ten strips (in this example), each strip is arbitrarily allocated a page strip rasterization time (PSRT) of 0.75 seconds. At a gross level, PSRT indicates the available time for processing (i.e., rasterizing) a series of display commands in a page strip. Generally speaking, if rasterization occurs within a PSRT, the page printer is able to maintain its specified (standard) page print rate. However, other schemes may be employed to fully utilize designated PSRT amounts and/or to carry over unused PSRT amounts. As such, in this disclosure, PSRT is defined to be the available time for rasterization given any particular scheme employed for utilizing and/or carrying over unused PSRT amounts.

Figure 2:
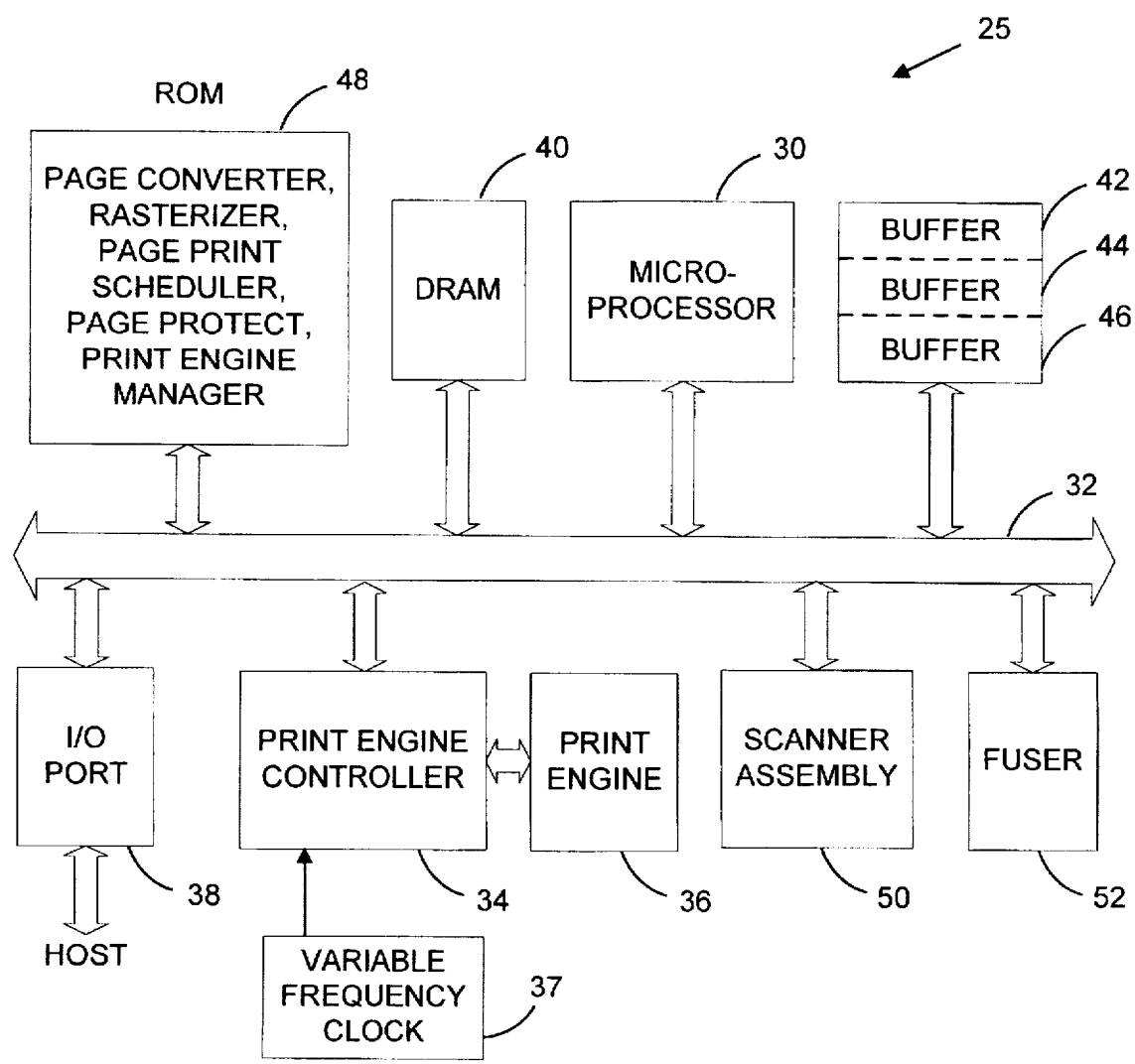
FIG. 2 is a high level block diagram of a printer that embodies the present invention for modifying the printer speed to prevent print overruns.

Turning to FIG. 2, a high level block diagram is shown of a page printer 25 incorporating the invention. The page printer is controlled by a microprocessor 30 which communicates with other elements of the system via bus 32. A print engine controller 34 and associated print engine 36 connect to bus 32 and provide the print output capability for the page printer. Print engine 36 is preferably a laser printer that employs an electrophotography drum imaging system, as well known in the art.

A variable frequency clock (VFC) 37 provides variable frequency clock signals to print engine controller 34. VFC 37 is operable to selectively apply a plurality of clock frequency signals in response to a control signal (not shown) received from microprocessor 30. As well known in the art, VFC 37 may comprise a crystal frequency source that feeds a count-down counter which, in turn, provides the clock signal. Alternatively, VFC 37 may be configured as a phase locked loop whose frequency is multiplied by an appropriate control signal.

Regardless of the actual VFC embodiment chosen, one of the plurality of clock signals supplied to print engine controller 34 occurs at a "standard" clock frequency for enabling continuous operation of the print engine at its "standard" print engine speed. The standard print engine speed is the printer's designated page-per-minute rate (or rate of movement of a page through the printer), and in this disclosure, "standard" print engine speed is defined to be that speed at which printing may safely and reasonably occur for an extended period of time (for example, without overheating). In contrast, a "maximum" print speed is some speed above the standard speed which is maintainable only for shorter durations of time. Obviously, as is well known in the art, a standard page-per-minute rate is dependent upon several factors, such as the microprocessor clock speed, print engine clock speed, how much memory is available, page complexity, etc., and may differ from an overall actual page-per-minute rate for any particular page.

Given the plurality of signals that can be generated by VFC 37, any second slower clock signal, relative to the standard clock frequency, when applied to engine controller 34, enables a corresponding slow-down in the controller and print engine processing actions.

An I/O port 38 provides communications between the page printer and a host computer and receives page descriptions from the host for processing within the page printer. A dynamic random access memory (DRAM) 40 provides random access memory for the page printer. A portion of DRAM 40 (shown separately) includes three (in this example) pre-allocated buffers 42, 44 and 46 which are employed during page strip processing. During the print process, each pre-allocated buffer receives a selected page strip's rasterized image data for storing and passing the same to print engine controller 34 and print engine 36. Only after one of buffers 42, 44 or 46 becomes available (i.e., the page strip's rasterized data is transferred/imaged onto the drum), can a next page strip of rasterized data be inserted.

A read only memory (ROM) 48 holds firmware which controls the operation of microprocessor 30 and the page printer. The code procedures stored in ROM 48 may include the following: a page converter, rasterizer, page print scheduler (including a page protect feature) and a print engine manager. The page converter firmware converts a page description received from the host to a display command list. As discussed, each display command defines an object to be printed on the page. The rasterizer firmware converts each display command to an appropriate (rasterized) bit map, and the bit map is stored in one of the pre-allocated buffers 42, 44 or 46 and subsequently passed to print engine 36 by print engine controller 34, thereby enabling the generation of an image (i.e., text/graphics etc). The page print scheduler controls the sequencing and transferring of page strip buffers to print engine controller 34.

Within the page print scheduler is page protection firmware which assures that print overruns do not occur during the processing of a page. Print overruns are avoided by utilizing the method (and means) of the present invention, or those methods cited in the prior art, or any combination thereof. The print engine manager controls the operation of print engine controller 34 and, in turn, print engine 36.

The operation of the page printer commences when it receives a page description from a host computer via I/O port 38. The page description is placed in DRAM 40. Microprocessor 30 accesses the page description, line by line, and builds a display command list using the page converter firmware in ROM 48. As discussed, the display command list is a set of commands that describe what must be printed and forms an intermediate description of the page. As the display command list is being produced, the display commands are sorted by location on the page and allocated to page strips (see FIG. 1). Each page strip is subsequently converted to and stored as a rasterized bit map in one of the buffers 42, 44 and 46 for use by print engine 36.

During the time that the page description is being converted to display commands, each command is examined and its rasterization execution time (RET) is determined. When the display commands are positionally sorted and assigned to the various page strips, the RET's for all display commands assigned to each strip are summed to derive a total RET for each strip.

RET is the time needed to render an object from its display command form into a rasterized form. It is known that rasterization time is related to the size of an object and it has been further found that the rasterization time can be found by summing three separate coefficients. The first coefficient is termed "overhead" and is the fixed amount of time microprocessor 30 spends on an object, independent of its size. The second coefficient is "height cost" which is proportional to the object's height, independent of its width. The third coefficient of this sum is termed "word cost" and is proportional to the number of words written to the destination bit map strip, independent of the object's height. The relationship between an object's actual RET and the method of predicting the RET is dependent upon the rasterization algorithm used and the execution speed of the microprocessor. Thus additional coefficients may be deemed useful, dependent upon the specifically used rasterization algorithms.

RET for all objects (e.g., vectors, trapezoids, bit maps) can thus be determined in advance, each with a different set of coefficients. Once the coefficients are determined for various expected objects, they are stored in a table and subsequently accessed when the type and dimensions of an object to be printed become known. Thus, RET for any display command can be readily determined by a table lookup of precalculated coefficients followed by a calculation of the sum of the coefficients, or modified by the object's size.

As can now be seen, during page composition, the page printer computes the size of an object when placing it's display command in the display command list. Given the object's size and its complexity coefficients, the total time needed to render that object into rasterized form is added to the RET of objects already contained within the list. Once page composition is complete, a total RET needed to render the entire display list is known, as is the time required to render each individual page strip.

At this point, the composed page is turned over for printing to a page print scheduler contained in ROM 48. The page print scheduler firmware contains a page protection sub-routine which prevents print overruns as a result of any strip requiring more rasterization time than PSRT (or PSRT plus the sum of any previously unused PSRT).

To summarize, the present invention identifies any complex page strip having a RET that exceeds the PSRT threshold. When that complex page strip is reached for rasterization, microprocessor 30 causes VFC 37 to decrease its clock frequency to a lower, appropriate clock frequency. As a result, print engine controller 34 causes print engine 36 to slow down its rate of page movement (without slowing the rasterization clock speed of microprocessor 30) sufficient such that microprocessor 30 is able to rasterize and image the complex strip without a print overrun occurring. In essence, the printing speed is modified relative to the RET of the page strip. This modification enables the printer to run with less memory than would normally be required because no pre-rasterization need occur to the complex strip.

Although it is simply indicated here that the print engine slows upon processing a complex page strip, it is understood by those of ordinary skill in the art that various components and systems in the "print engine" are affected for slowing the printing. For example, the rate of data flow to scanner assembly 50 is slowed such that the flow coordinates properly with the slower engine speed. Similarly, a fuser 52 is modified respectively to enable proper fusing temperatures. Given that fuser 52 may be a conventional "instant on" fuser, the fuser temperature is easily and instantly modifiable, selectively, as follows:

(a) relative to each complex strip processed;

(b) relative to a standard fuser temperature associated with the standard rate of movement of the page through the printer, and a minimum fuser temperature associated with the minimum rate of movement of the page through the printer;

(c) relative to a rate of movement of the page through the printer;

(d) relative to a mass associated with a fuser assembly in the fuser area;

(e) at points in time when the page is simultaneously present in both an imaging drum area of the printer and the fuser area; and, (f) to maintain the standard fuser temperature (i) prior to the page entering into the fuser area and (ii) at points in time when the page is present only in the fuser area or beyond.

Finally, although scanner assembly 50 and fuser 52 are shown separately in FIG. 2 for clarity, it is understood that in reality they are generally considered part of print engine 36.

Figure 3:
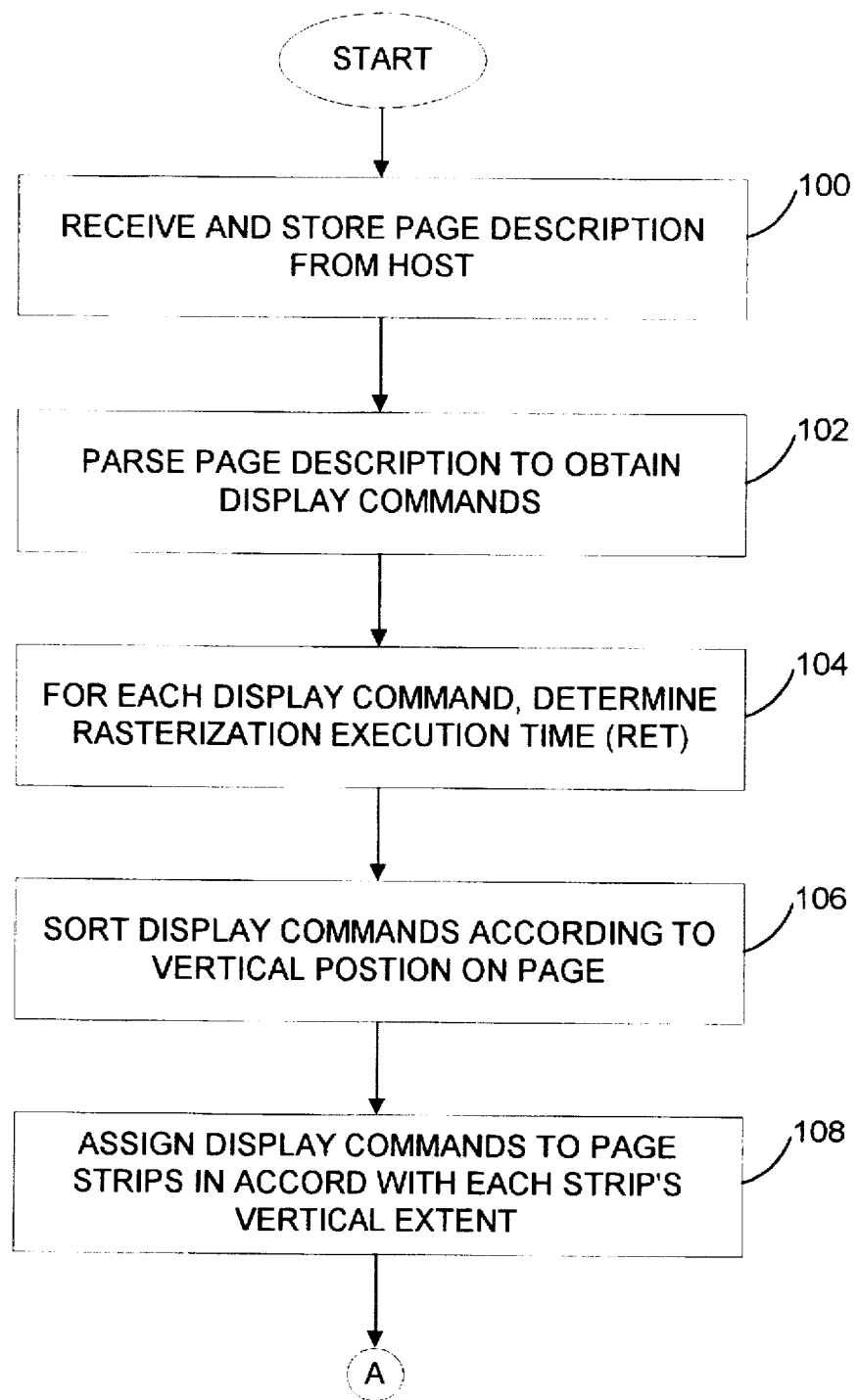
FIGS. 3 and 4 show a high level flow diagram describing a preferred method of the invention.

Turning now to the flow charts depicted in FIGS. 3 and 4, the operation of the invention will be described in conjunction with the system block diagram of FIG. 2. Initially (FIG. 3), the page printer receives and stores a page description 100 from the host computer. Microprocessor 30 then calls the page converter code from ROM 48 that, in turn, parses the page description and creates a display command list 102. Each display command is examined and its rasterization execution time (RET) is determined 104. The display commands are then sorted in accordance with their vertical position on the page 106 (this may occur substantially simultaneously with the parsing), and assigned to page strips in accordance with each page strip's vertical extent 108.

Figure 4:
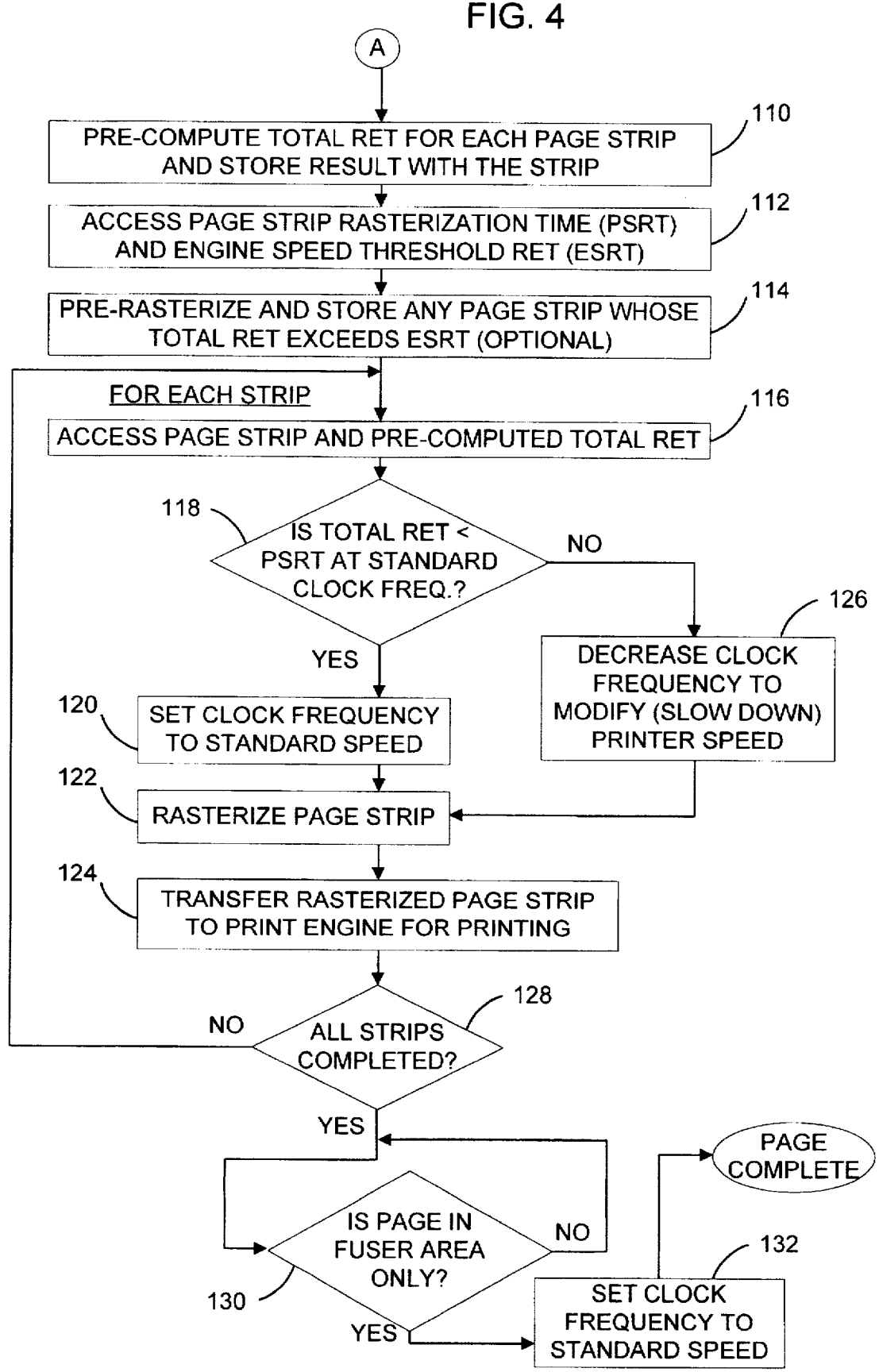

Referring now to FIG. 4, the page protection routine then calculates a total RET 110 for all display commands for each strip. The page strip rasterization time (PSRT) and the engine speed threshold RET (ESRT) constants are then accessed 112. PSRT may be either precomputed and stored, or calculated by dividing the page print time by the number of page strips. ESRT is the maximum amount of time for which imaging of a page strip can occur given the minimum engine (printing) speed achievable (i.e., minimum rate of movement of a page through the printer). ESRT is dependent upon several factors, such as stepper motor speed range, minimum fuser temperature (energy output), etc.

Next, each strip's total RET is read to determine if it exceeds ESRT. If a page strip's total RET exceeds ESRT 114, then that strip is, optionally, pre-rasterized. Under the present invention, pre-rasterization is rare because the print engine speed is modified (slowed) sufficiently to avoid print overruns of complex strips that would typically require pre-rasterization under conventional printing techniques. However, the ESRT check is done at the outset just in case the modified print speed is not capable of handling a particularly complex strip. In such a case, any conventional option may be implemented, such as pre-rasterizing the strip.

A selected page strip is then accessed 116 along with its total RET value to begin actual page processing and rasterization. The total strip RET is compared 118 to PSRT to determine if its rasterization time is less than (or equal to) PSRT. If yes, VFC 37 is set (or reset, if not already set) 120 to the standard clock frequency to enable print controller 34 and print engine 36 to print at the standard print engine speed. Subsequently (or simultaneously), the page strip is rasterized 122 by microprocessor 30 at the standard microprocessor rasterization clock speed. The rasterized page strip is then passed 124 to print engine controller 34 and print engine 36 for printing.

On the other hand, if the total RET for the selected page strip is found to be greater 118 than PSRT (i.e., it is a "complex" page strip). VFC 37 is set 126 to a lower (than standard) clock frequency to enable the print engine controller to reduce the print engine speed. In essence, this effectuates a modification of the printing speed relative to the total RET of the selected page strip. The reduced printing speed slows the imaging of any page strip(s), as necessary, that have already been rasterized into buffers 42, 44 or 46. The printing is slowed sufficiently just to provide enough time for the selected complex strip to be rasterized. This controlled slowing is provided by selectively tapping into the plurality of clock signals that may be generated by VFC 37, and by monitoring actual total RET time associated with each strip that is to be imaged ahead of the complex strip. Also, as previously discussed, and as obvious to those of ordinary skill in the art, this reduction of the printing speed includes slowing the rate of data flow to the scanner assembly 40 and modifying the fuser temperature 52 accordingly.

Next, the selected page strip is rasterized 122 by microprocessor 30, and the rasterized strip is then passed 124 to print engine controller 34 and print engine 36 for printing. Although the printing process is slowed by VFC 37 as necessary for those buffers that are already rasterized, the actual rasterization processing speed of the selected (complex) page strip is not slowed. Specifically, any clock signal (not shown) that controls microprocessor 30 for rasterizing the selected strip is not slowed. Rather, rasterization of the selected strip continues at its standard rasterization (clock) speed or, optionally, at an increased speed as described in the Briggs patent, depending upon system configurations. In this manner, only the engine speed (rate of movement of the page) is decreased to compensate for a longer rasterization time required by a complex strip.

If more strips remain to be processed 128, the procedure recycles to access the next page strip 116 and its total RET. If no strips remain, the page is finished. If the page is finished, and the page is in the fuser area only 130, VFC 37 is set (or reset) 132 to the standard clock frequency or, optionally, to an increased or "maximum" frequency, to enable the print controller to eject the page from (or through) the fuser at the increased print engine speed.

In the above manner, print engine 36 is modified to print at a lower page-per-minute throughput rate to prevent a page overrun when a complex page strip is encountered. The slower printing speed provides sufficient time for the complex page strip to be rasterized for subsequent imaging. In this context, a key advantage of the present invention is that less memory is required (relative to conventional printer systems) because pre-rasterization of complex strips may be virtually eliminated.

As discussed, it is possible that the rasterization time of certain complex page strips will still exceed the capability of the print engine running at the slowest engine speed method described herein. However, this situation may be managed by utilizing the pre-rasterization method described in Cuzzo, and/or the increased microprocessor speed described in Briggs, or some other conventional method.

What has been described above are the preferred embodiments for a system and method for preventing print overruns by controlling print engine speed. However, it should be understood that the foregoing description is only illustrative of the invention. Various alternatives and modifications can be devised by those skilled in the art without departing from the spirit and scope of the invention. For example, while the invention has been described in a laser printer environment, it is equally applicable to other types of printers which may experience print overrun type problems (e.g. ink jet printers). Accordingly, the present invention is intended to embrace all such alternatives, modifications and variances which fall within the scope of the appended claims.

What is claimed is:

1. A method of printing a page in a printer, the page having been divided into a plurality of page strips, the method comprising:
   (a) determining a total rasterization execution time (RET) for each page strip; and,
   (b) modifying a printing speed for each page strip relative to the RET of each page strip for printing the page.

2. The method of claim 1 wherein modifying the printing speed includes slowing the printing speed responsive to a selected page strip RET indicative of a complex page strip, but without reducing rasterization processing speed of the selected page strip.

3. The method of claim 1 wherein modifying the printing speed includes modifying within the printer at least one of: (i) a print engine speed, and (ii) a rate of data flow to a scanner assembly.

4. The method of claim 1 wherein modifying the printing speed includes modifying a clock rate for controlling print engine timing.

5. The method of claim 4 wherein the clock rate is modified relative to the RET of a page strip selected for rasterization processing.

6. The method of claim 1 wherein modifying the printing speed includes modifying a rate of movement of the page through the printer relative to a standard and a minimum rate of movement of the page through the printer.

7. The method of claim 6 further including pre-rendering a selected page strip if its respective RET exceeds an engine speed threshold RET (ESRT), the ESRT indicative of a maximum amount of time for which imaging of the selected page strip can occur at the minimum rate of movement of the page through the printer.

8. The method of claim 6 further including printing a selected page strip at least at the standard rate of movement of the page through the printer if the selected page strip's RET does not exceed an engine speed threshold RET (ESRT), the ESRT indicative of a maximum amount of time for which imaging of the selected page strip can occur at the minimum rate of movement of the page through the printer.

9. The method of claim 6 further including printing the page at least at the standard rate of movement of the page through the printer when the page is present only in a fuser area of the printer or beyond.

10. The method of claim 6 further including modifying a fuser temperature in a fuser area of the printer relative to the RET of each page strip.

11. The method of claim 10 further including, selectively, modifying the fuser temperature:
   (a) relative to a standard fuser temperature associated with the standard rate of movement of the page through the printer, and a minimum fuser temperature associated with the minimum rate of movement of the page through the printer;
   (b) relative to a rate of movement of the page through the printer;
   (c) relative to a mass associated with a fuser assembly in the fuser area;
   (d) at points in time when the page is simultaneously present in both an imaging drum area of the printer and the fuser area; and, (e) to maintain the standard fuser temperature (i) prior to the page entering into the fuser area and (ii) at points in time when the page is present only in the fuser area or beyond.

12. A page printer comprising:

(a) means for determining a total rasterization execution time (RET) for each of a plurality of page strips of a page to be printed; and, (b) means for modifying a printing speed for each of the plurality of page strips relative to the RET of each page strip for printing the page.

13. The printer of claim 12 wherein the means for modifying the printing speed includes means for slowing the printing speed responsive to a selected page strip RET indicative of a complex page strip, but without reducing rasterization processing speed of the selected page strip.

14. The printer of claim 12 wherein the means for modifying the printing speed includes means for modifying within the printer at least one of: (i) a print engine speed, and (ii) a rate of data flow.

15. The printer of claim 12 wherein the means for modifying the printing speed includes means for modifying a clock rate for controlling print engine timing.

16. The printer of claim 15 wherein the clock rate is modified relative to the RET of a page strip selected for rasterization processing.

17. The printer of claim 12 wherein the means for modifying the printing speed includes means for modifying a rate of movement of the page through the printer relative to a standard and a minimum rate of movement of the page through the printer.

18. The printer of claim 17 further including means for printing the page at least at the standard rate of movement of the page through the printer when the page is present only in a fuser area of the printer or beyond.

19. The printer of claim 17 further including means for modifying a fuser temperature in a fuser area of the printer relative to the RET of each page strip.

20. The printer of claim 19 further including, selectively, means for modifying the fuser temperature:

(a) relative to a standard fuser temperature associated with the standard rate of movement of the page through the printer, and a minimum fuser temperature associated with the minimum rate of movement of the page through the printer;

(b) relative to a rate of movement of the page through the printer;

(c) relative to a mass associated with a fuser assembly in the fuser area;

(d) at points in time when the page is simultaneously present in both an imaging drum area of the printer and the fuser area; and, (e) to maintain the standard fuser temperature (i) prior to the page entering into the fuser area and (ii) at points in time when the page is present only in the fuser area or beyond.

21. A computer-readable medium having computer-executable instructions for performing the method as recited in claim 1.

* * * * *